United States Patent [19]

Brusasco

[11] Patent Number: 5,050,347
[45] Date of Patent: Sep. 24, 1991

[54] VEHICLE DOOR
[75] Inventor: Enzo Brusasco, Turin, Italy
[73] Assignees: Roltra, Morse S.p.A.; DuPont DeNemors Italiana S.p.A., both of Italy
[21] Appl. No.: 609,771
[22] Filed: Nov. 7, 1990
[30] Foreign Application Priority Data
  Nov. 9, 1989 [IT] Italy .................. 67985 A/89
[51] Int. Cl.$^5$ .................. E05F 11/48; B60J 5/04
[52] U.S. Cl. .................. 49/348; 49/352; 49/502
[58] Field of Search .................. 49/348, 352, 349, 350, 49/351, 353, 502; 246/146, 153, 39.1

[56] References Cited
U.S. PATENT DOCUMENTS
1,457,316  6/1923  Price .................. 49/352
4,766,697  8/1988  Boileau .................. 49/352
4,866,883  9/1989  Brown et al. .................. 49/502

Primary Examiner—Philip C. Kannan
Attorney, Agent, or Firm—Shlesinger, Arkwright & Garvey

[57] ABSTRACT

A vehicle door having an upper window opening fitted with a sliding window and consisting, at the bottom, of a box body defined by an inner sheet and an outer sheet peripherally connected to each other; the inner sheet having an upper opening closed by a self-supporting panel preferably formed from synthetic material, a first surface of which, facing the outer sheet, is fitted integral with door locking mechanisms and window regulating and guide mechanisms, and the other surface of which constitutes the interior finish surface of the door together with a lower finish panel.

8 Claims, 5 Drawing Sheets

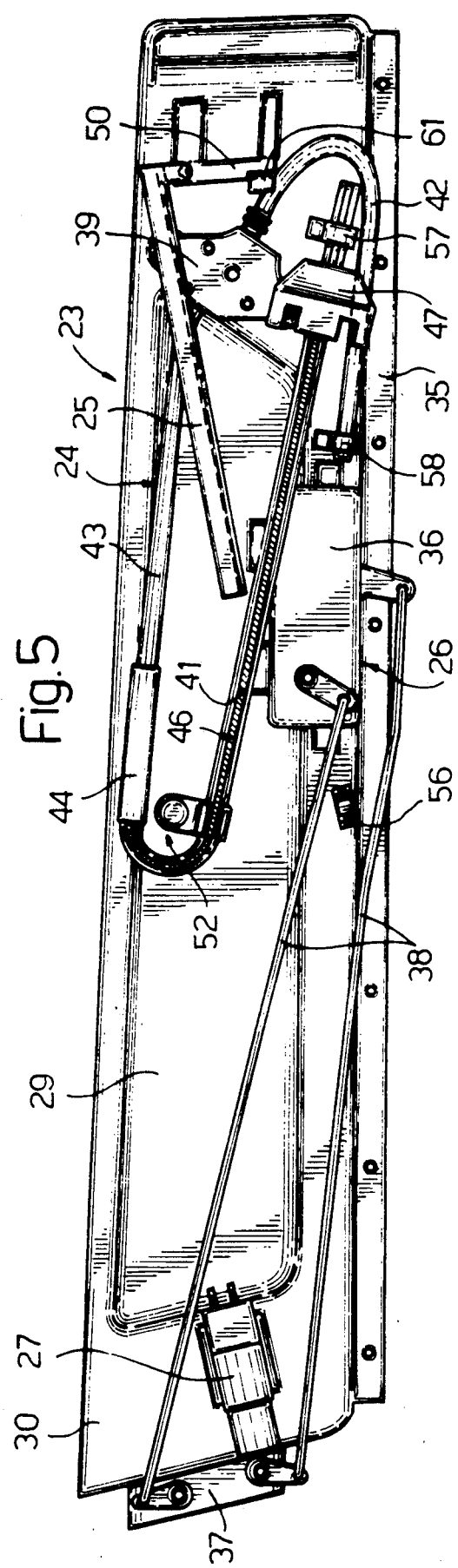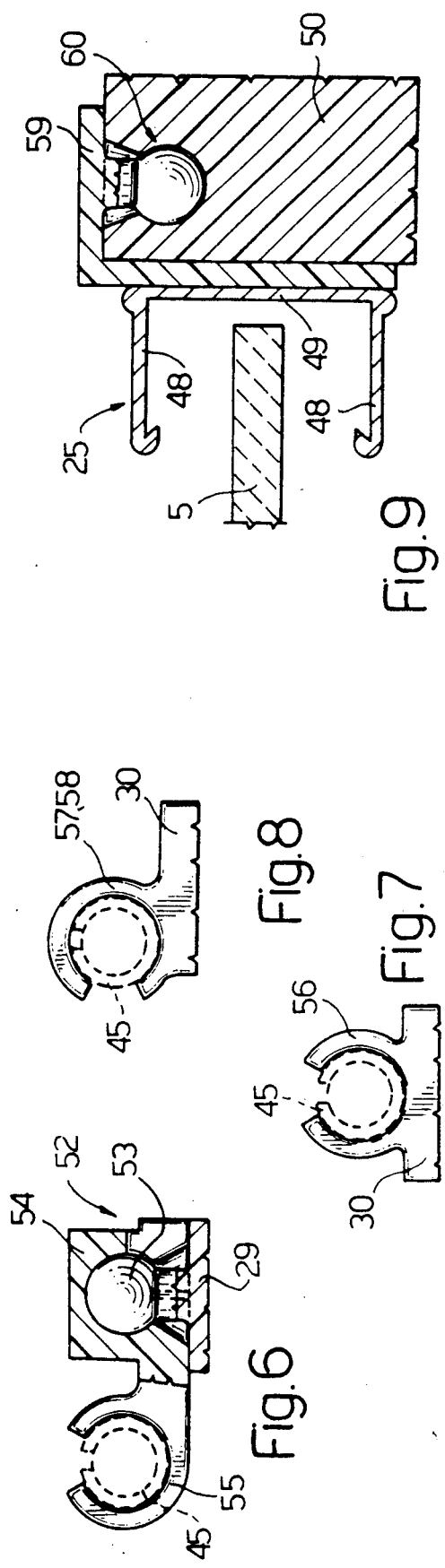

VEHICLE DOOR

BACKGROUND OF THE INVENTION

The present invention relates to a vehicle door.

Vehicles are known to be fitted with doors comprising an inner and outer metal sheet clinched and welded together to form a frame, the upper portion of which defines a window frame fitted with a window mounted in sliding manner between the two sheets, and the lower portion of which defines a frame or a box body closed inwardly and outwardly by the lower portions of said two sheets. The lower portion of the outer sheet defines the outside of the door, while the lower portion of the inner sheet presents a number of holes enabling insertion, inside the box body, of all the functional components on the door (locks, window regulators, etc.) which are connected to the inner sheet itself. Once the functional components are assembled, the lower portion of the inner sheet is fitted with a finish panel, usually formed from synthetic material and incorporating finish elements, such as armrests, handles, etc.

In recent times, mainly for the purpose of speeding up on-line assembly, testing and setup, the lower portion of the inner sheet, which was formerly an integral part of the door structure, has been replaced by a preassembled panel connected by means of screws or similar removable fasteners, and fitted with the window regulating and guide devices and the door locking devices.

The load-bearing structure of the lower portion of a door of the aforementioned type therefore consists merely of an outer sheet and an inner sheet clinched and welded peripherally to the outer sheet and having an opening substantially extending over the entire lower portion of the door. On such a door, the opening formed in the lower portion of the inner sheet is partially closed by the preassembled panel connected to the inner panel, while the inner contour of the door is again defined by the finish panel.

Though satisfactory in many respects, known doors of the aforementioned type present a number of drawbacks both technically and economically.

In fact, formation of the opening in the inner sheet for assembling the preassembled panel seriously reduces the torsional resistance of the load-bearing structure, with the result that high-cost automatic handling equipment must be provided at the automatic assembly and welding stages. Moreover, the presence of the preassembled panel does not exclude the presence of the interior finish panel which, comprising members for operating the devices on the preassembled panel, must be connected functionally to the same on the assembly line.

SUMMARY OF THE INVENTION

The aim of the present invention is to provide a vehicle door designed to overcome the above drawbacks. With this aim in view, according to the present invention, there is provided a vehicle door having an upper window opening fitted with a sliding window, and comprising, at the bottom, a box body defined by an inner sheet and an outer sheet connected peripherally to each other; characterised by the fact that said inner sheet presents an opening extending over a relatively small upper portion of the same; a first self-supporting interior finish panel being connected in removable manner to said inner sheet for closing said opening; a second interior finish panel being provided outside said box body for covering said inner sheet; and door locking means and window regulating and guide means being connected to the surface of said first panel facing said outer sheet.

Thus, on the above door, only a relatively small portion of the inner sheet is removed for assembling the self-supporting panel, so that the lower portion of the door presents a substantially shell type structure having a relatively high torsional strength.

Moreover, in addition to retaining all the advantages afforded by a panel prefitted with all the door accessories, the above door provides, at least on the self-supporting panel, for dispensing with a finish panel and all the operations required for functionally connecting the same to the self-supporting panel.

On the above door, said window regulating and guide means preferably comprise respective portions arranged, in use, in respective operating positions wherein said portions project below the lower edge of said opening; each said portion being connected to said first panel so as to move, in relation to said first panel, between said projecting operating position and an assembly position wherein said portion is housed entirely within the perimeter of said opening.

The advantage of the above design characteristic is that it enables said preassembled panel to be assembled and connected automatically to said box body.

BRIEF DESCRIPTION OF THE DRAWINGS

A non-limiting embodiment of the present invention will be described by way of example with reference to the accompanying drawings, in which:

FIG. 5 shows the same view as in FIG. 4, but with certain parts in a different operating position;

FIG. 6 shows a larger-scale section of a first detail in FIG. 5;

FIG. 7 shows a larger-scale section of a second detail in FIG. 5;

FIG. 8 shows a larger-scale section of a third detail in FIG. 5;

FIG. 9 shows a larger-scale section of a fourth detail in FIG. 5;

DETAILED DESCRIPTION OF THE INVENTION

Figure 3:
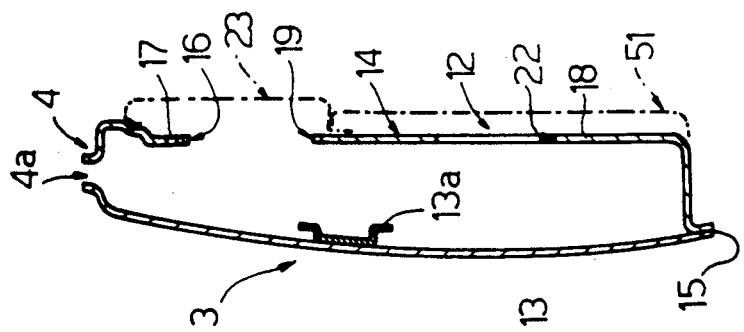
FIG. 3 shows a section along line III—III in FIG. 2.
Figure 1:
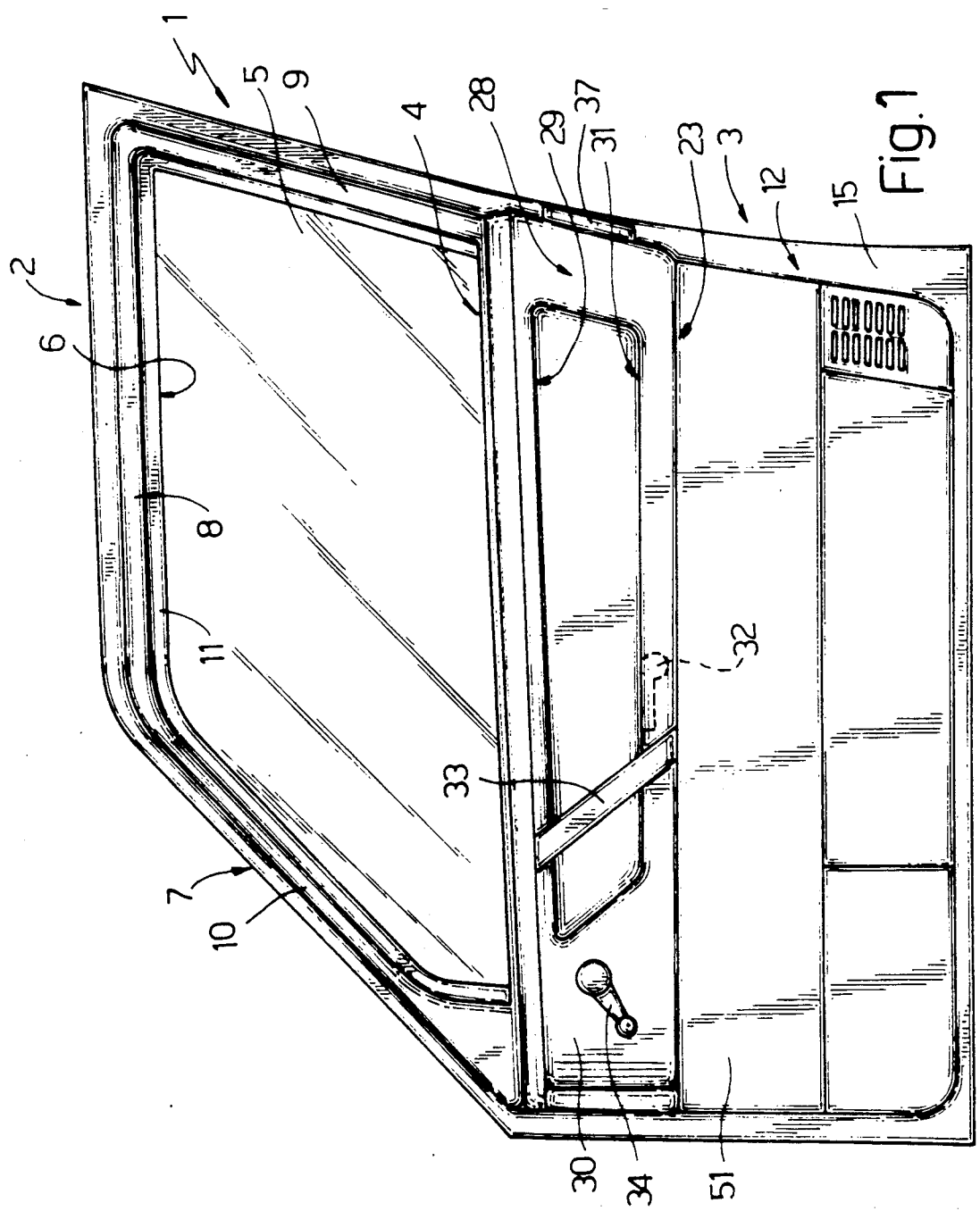
FIG. 1 shows a side view, from the inside, of a preferred embodiment of the door according to the present invention.
Figure 2:
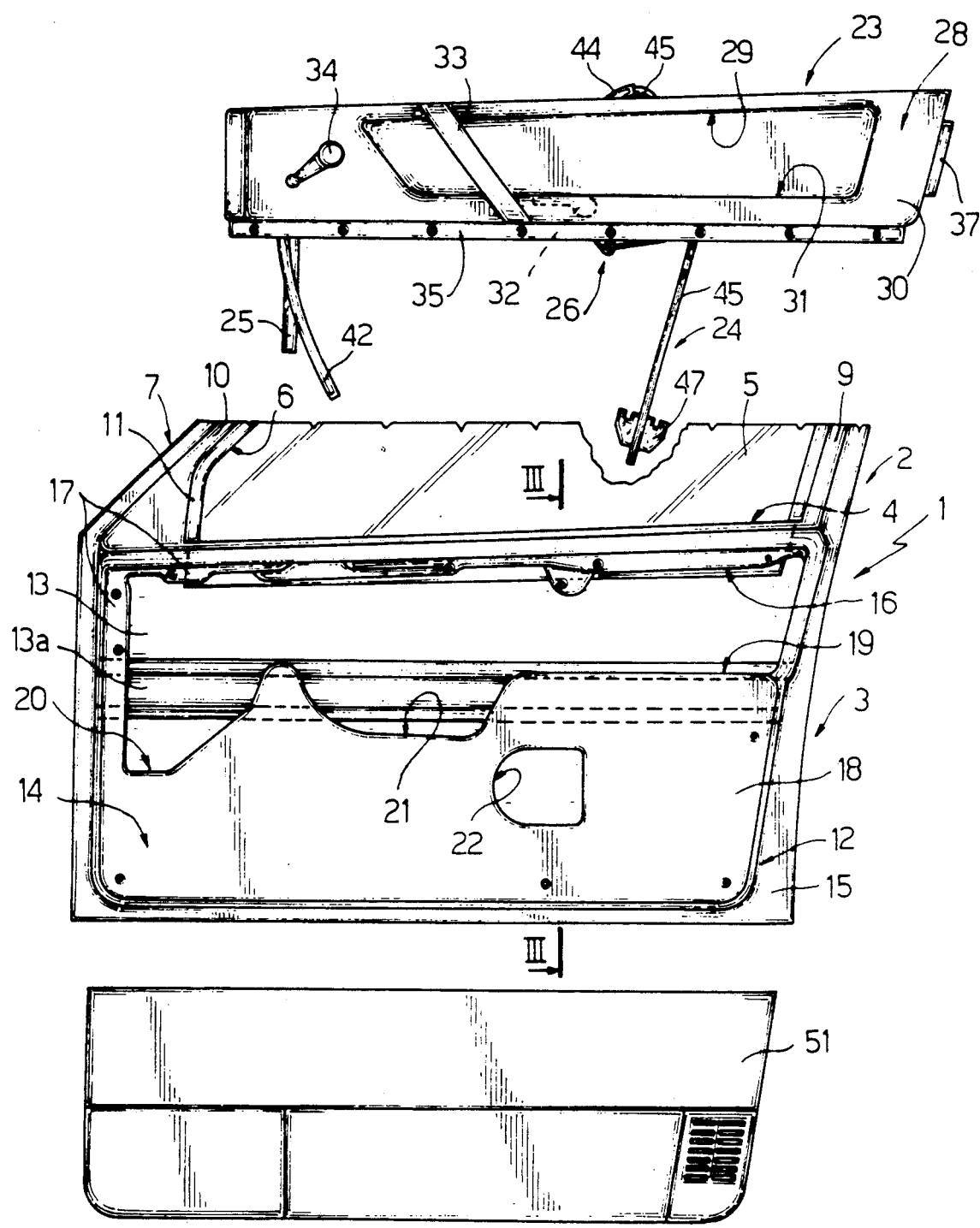
FIG. 2 shows an exploded view of part of the FIG. 1 door.

Number 1 in FIGS. 1 and 2 indicates a vehicle door comprising an upper portion 2 and a lower portion 3 separated by a substantially horizontal cross member 4 having a longitudinal opening 4a (FIG. 3) in which is fitted a sliding window 5.

Upper portion 2 presents an opening 6 surrounded by a substantially U-shaped frame 7 having its concave side facing downwards towards cross member 4 with which the bottom end of frame 7 is integral. Frame 7 comprises an upper cross member 8 substantially parallel to cross member 4 and connected to the rear end of the same by a first substantially vertical post 9, and to the front end of cross member 4 by a second inclined post 10. The inner edge of posts 9 and 10 and cross member 8 is fitted with a channel 11 for housing and guiding window 5.

As shown in FIG. 2, lower portion 3 of door 1 consists of a box body 12 defined by a convex outer sheet 13 and a convex inner sheet 14, the side and bottom edges of which are connected to form a frame 15, and the top edges of which define cross member 4. Sheet 13 defines the outer contour of the lower portion of door 1, and is fitted on the inside surface with a strengthening section 13a. At the top, just below cross member 4 and inside frame 15, sheet 14 presents a transverse opening 16, the height of which is relatively small as compared with that of the lower portion of door 1, and which is so formed as to define a peripheral flange 17 extending along its top and front edges. Opening 16 is defined at the bottom by a panel 18 forming part of sheet 14 and substantially coplanar with flange 17. Panel 18 is defined at the top by a substantially straight, horizontal edge 19 having two recesses 20 and 21, and presents a relatively small, substantially central opening 22.

Figure 4:
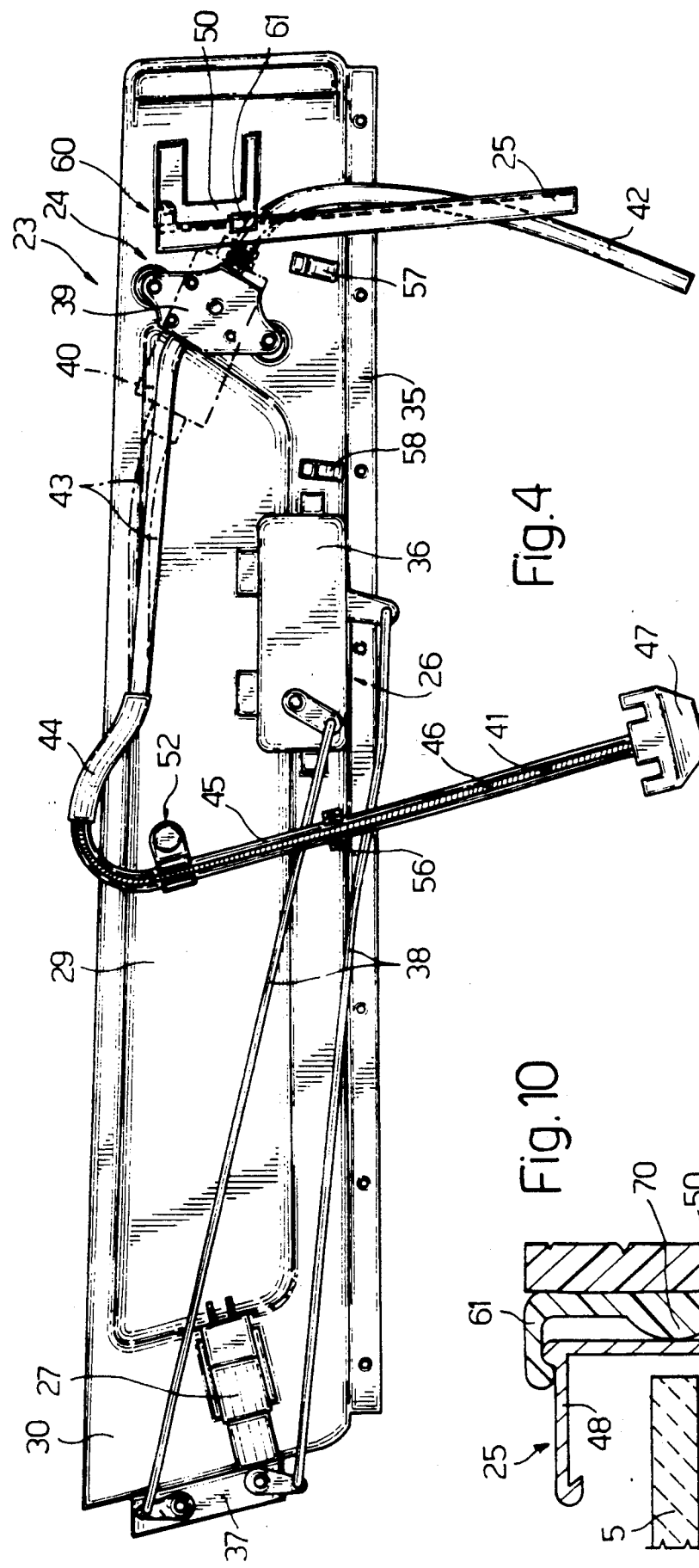
FIG. 4 shows a larger-scale view of a detail in FIG. 2.

As shown in FIG. 4, opening 16 is closed by a self-supporting, substantially rectangular panel 23 prefitted, on the side facing sheet 13, with a window regulating device 24, a channel 25 for guiding window 5, a lock device 26 and a door locking device 27 (FIG. 4).

As shown in FIG. 2, on the opposite side to that facing sheet 13, panel 23 presents an interior finish surface 28 for door 1. In particular, the central portion of surface 28 of panel 23 presents a substantially rectangular recessed portion 29 surrounded by a substantially flat frame 30 and defined at the bottom by a shoulder 31 substantially perpendicular to the FIG. 2 plane and having an opening (not shown) for a handle 32 by which to operate lock device 26. On the front portion of recessed portion 29, the shoulder 31 of which acts as an armrest, panel 23 presents a fixed grip handle 33 extending across recessed portion 29 and connected at opposite ends to the upper and lower portions of frame 30. The front portion of frame 30 is fitted through with a rotary handle 34 for manually operating window regulating device 24.

Below frame 30, panel 23 presents a flange 35 having a number of holes for connecting panel 23 to the opposite surface of sheet 14 to that facing sheet 13. Further holes (not shown) are formed along the top and side edges of panel 23 for connecting the same to flange 17.

As shown in FIG. 4, lock device 26 comprises a known control box 36 connected integral with panel 23 on the lower portion of frame 30, and connected to handle 32 through panel 23. Lock device 26 also comprises a known type of lock 37 mounted on the rear edge of panel 23 and connected to control box 36 via ties 38 and to door lock device 27, which is connected to panel 23 on the rear portion of frame 30.

Again with reference to FIG. 4, window regulating device 24 comprises a know type of control box 39 connected to handle 34 through panel 23 and supported by panel 23 on the front portion of frame 30. As shown by the dotted line in FIG. 4, box 39 may be replaced by a known box 40 of an electromechanical control device, in which case, handle 34 is usually dispensed with.

Window regulating device 24 comprises an actuating member consisting of a precompressed spring 41 fitted through box 39 or 40, and mounted in axially-sliding manner inside a flexible input conduit 42 extending substantially vertically downwards from box 39 or 40, and inside an output conduit 43 extending substantially horizontally towards the rear end of panel 23. By means of a hose portion 44, the rear end of conduit 43 is connected to the curved top end of a guide 45 extending substantially vertically downwards and having a longitudinal opening 46 engaged in sliding manner by a connecting element (not shown) connecting the free end of spring 41 to a plate 47 connected to sliding window 5.

Figure 10:
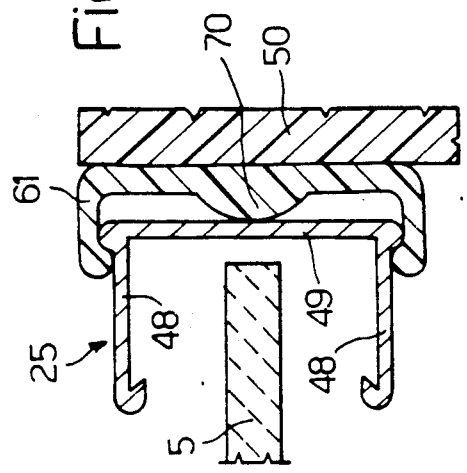
FIG. 10 shows a larger-scale section of a fifth detail in FIG. 5.

As shown in FIG. 4, window channel 25 is supported on panel 23 to the front of box 39 or 40, and is positioned substantially vertically with its concave side facing the rear end of panel 23. As shown in FIGS. 9 and 10, channel 25 is substantially U-shaped, and comprises two lateral arms 48 lying in planes substantially parallel to that of frame 30 and connected by a core 49, the upper portion of which extends contacting a supporting rib 50 integral with panel 23 and located to the front of box 39 or 40.

As shown in FIG. 2, panel 18 is fitted with a finish panel 51 preferably formed from synthetic material, having a surface finish as required, and the top edge of which covers flange 35.

For automatically fitting panel 23 on to sheet 14, i.e. by means of a robot, channel 25, conduit 42 and guide 45 (which, as shown in FIG. 2, project, in the operating position, below the bottom edge of panel 23) are designed to collapse in relation to panel 23 into an idle or assembly position (FIG. 5) wherein they are located substantially behind panel 23, thus enabling panel 23 to be fitted side by side on to sheet 14, i.e. with no movement required of panel 23 in relation to sheet 14 other than a substantially traversing movement perpendicular to the plane of sheet 14.

To achieve this, close to the end connected to hose 44, guide 45 is connected to panel 23 by a spherical snap joint 52 consisting, as shown in FIG. 6, of a spherical head 53 integral with the end wall of recessed portion 29 of panel 23, and a plate 54 having a spherical seat engaged by head 53 and fitted integral with a fork 55 engaged by guide 45. When in the operating position shown in FIG. 4, guide 45 is prevented from rotating in relation to panel 23 by the intermediate portion of guide 45 frontally engaging a flexible fork 56 (FIG. 7) integral with the lower portion of frame 30. When in the idle position shown in FIG. 5, on the other hand, guide 45 is prevented from rotating in relation to panel 23 by the end portion of guide 45 laterally engaging a flexible fork 57 (FIG. 8) integral with the front portion of frame 30.

The front portion of frame 30 is also fitted with a further laterally-engaged flexible fork 58 similar to fork 57 and designed to maintain conduit 42 in the collapsed idle position shown in FIG. 5.

As shown in FIG. 9, the top end of channel 25 presents a side plate 59 connected to the top of rib 50 by a spherical friction joint 60.

When assembling panel 23 on to sheet 14, window 5 is maintained in the raise position, wherein the bottom edge of window 5 is located over the top end of channel 25 maintained by friction in the collapsed position shown in FIG. 5.

Once panel 23 is assembled, the operator grips guide 45 through recess 21 and turns it downwards about an axis through spherical head 53 and substantially perpendicular to panel 23, so as to release guide 45 from fork 57 and engage fork 56. The operator then does the same with flexible conduit 42, which is released from fork 58 and allowed to drop down. Window 5 is then lowered manually so as to engage channel 25 and turn it, about an axis substantially perpendicular to panel 23, from the collapsed position shown in FIG. 5 into the lowered operating position shown in FIG. 4, wherein it engages a C-shaped fork 61 integral with rib 50 (FIG. 10). The lowered window 5 is then connected manually to plate 47 through opening 22.

Assembly of door 1 is then completed by fitting on panel 51.

Figure 11:
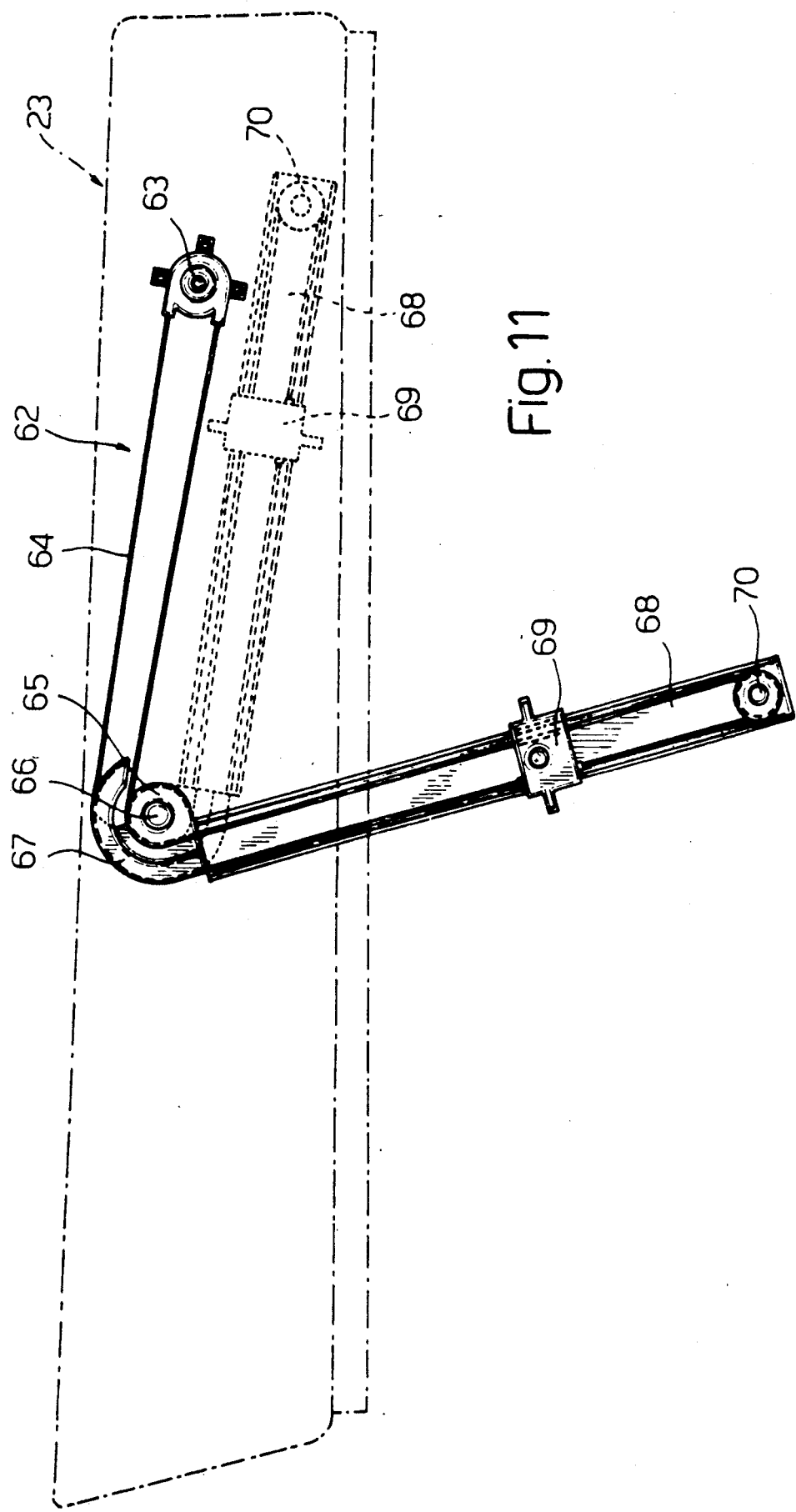
FIG. 11 shows a variation of the FIG. 4 detail, with parts removed for simplicity.

According to the variation illustrated in FIG. 11, window regulating device 24 described above is replaced by a know cable-operated device 62 comprising a drum 63 operated by handle 34 and about which is wound a length of flexible cable 64. Device 62 also comprises a pulley 65 pivoting about point 66 on panel 23; and a sector 67 also pivoting about point 66 on panel 23 and fitted with a guide rod 68 in turn fitted in sliding manner with a plate 69 connected to window 5. Cable 64 is connected to plate 69 and looped about drum 63, pulley 65, sector 67 and a pulley 70 mounted on the opposite end of rod 68 to that connected to sector 67.

As shown by the dotted line in FIG. 11, device 62, like device 24, is collapsible about pin 66 into an idle or assembly position wherein no part of device 62 projects outwards of panel 23.

As already stated, panel 23 is molded from synthetic material, but may be formed from any material providing the mechanical characteristics are such as to ensure the required rigidity of panel 23 and enable connection of devices 24 to 27.

Should panel 23 be molded from synthetic material, this provides for direct molding of both the elements shown in FIGS. 6 to 10, and appropriate connecting elements (not shown) for securing door lock device 27 and boxes 36 and 39 (or 40) to panel 23.

I claim:

1. A vehicle door (1) having an upper window opening (6) fitted with a sliding window (5), and comprising, at the bottom, a box body (12) defined by an inner sheet (14) and an outer sheet (13) connected peripherally to each other; characterised by the fact that said inner sheet (14) presents an opening (16) extending over a relatively small upper portion of the same; a first self-supporting interior finish panel (23) being connected in removable manner to said inner sheet (14) for closing said opening (16); a second interior finish panel (51) being provided outside said box body (12) for covering said inner sheet (14); and door locking means (26, 27) and window regulating and guide means (24, 25) being connected to the surface of said first panel (23) facing said outer sheet (13).

2. A door as claimed in claim 1, characterised by the fact that said regulating (24) and guide (25) means comprise respective portions arranged, in use, in respective operating positions wherein said portions project below the bottom edge (19) of said opening (16); each said portion being connected to said first panel (23) so as to move, in relation to said first panel (23), between said projecting operating position and an assembly position wherein said portion is withdrawn and housed entirely within the perimeter of said opening (16).

3. A door as claimed in claim 2, characterised by the fact that first (56, 61) and second (57, 58) locking means are provided on said first panel (23) for respectively maintaining said projecting portions in said operating and said assembly positions.

4. A door as claimed in claim 2, characterised by the fact that said window regulating and guide means respectively comprise a window regulating device (24) and a guide channel (25); a portion of said channel (25) constituting one said projecting portion; and said window regulating device (24) comprising guide means (45) for a plate (47) connected to said window (5); a portion of said guide means (45) constituting a further said projecting portion.

5. A door as claimed in claim 4, characterised by the fact that said guide means (45) and said channel (25) are connected to said first panel (23) via respective hinge means (52, 60) so as to turn, in relation to said first panel (23), between said operating and assembly positions and about respective axes substantially perpendicular to said first panel (23).

6. A door as claimed in claim 1,
characterised by the fact the the surface (28) of said first panel (23) opposite the surface facing said outer sheet (13) is so formed as to define an armrest (31).

7. A door as claimed in claim 1,
characterised by the fact that the surface (28) of said first panel (23) opposite the surface facing said outer sheet (13) is so formed as to define a grip handle (33).

8. A door as claimed in claim 1,
characterised by the fact that said first panel (23) is molded from synthetic material.

* * * * *